United States Patent
Sonai et al.

(10) Patent No.: US 7,560,184 B2
(45) Date of Patent: Jul. 14, 2009

(54) PROTON-CONDUCTING ELECTROLYTE AND FUEL CELL USING THE SAME

(75) Inventors: Atsuo Sonai, Yokohama (JP); Takahiro Tago, Tokyo (JP); Hiroyuki Nishide, Tokyo (JP)

(73) Assignee: Samsung SDI Co., Ltd., Suwon (KR)

( * ) Notice: Subject to any disclaimer, the term of this patent is extended or adjusted under 35 U.S.C. 154(b) by 835 days.

(21) Appl. No.: 11/070,169

(22) Filed: Mar. 3, 2005

(65) Prior Publication Data

US 2005/0196658 A1   Sep. 8, 2005

(30) Foreign Application Priority Data

Mar. 3, 2004   (JP)   ............... 2004-059139
Sep. 16, 2004   (KR)   ............ 10-2004-0074190

(51) Int. Cl.
*H01M 8/10* (2006.01)
*H01M 8/02* (2006.01)
*C08L 77/00* (2006.01)

(52) U.S. Cl. ...................... 429/33; 429/314
(58) Field of Classification Search ............. 429/33, 429/314

See application file for complete search history.

(56) References Cited

U.S. PATENT DOCUMENTS

2002/0103327 A1   8/2002   Claub

FOREIGN PATENT DOCUMENTS

| JP | 11502245 | 2/1999 |
| KR | 1020050089125 | 9/2005 |
| WO | 9629359 | 9/1996 |

OTHER PUBLICATIONS

Claims of U.S. Appl. No. 11/650,956.*
Claims of U.S. Appl. No. 11/940,440.*
Japanese publication of PCT No. Hei 11-502245; T. Kobayashi, M. Rikukawa, K. Sanui, N. Ogata, Solid State Ionics, vol. 106, 1998, p. 219.
Kobayashi et al. "Proton-conducting polymers derived from poly(ether-etherketone) and poly(4-phenoxybenzoyl-1,4-phenylene)" Solid State Ionics 106 (1998), pp. 219-255.

* cited by examiner

*Primary Examiner*—Duc Truong
(74) *Attorney, Agent, or Firm*—H.C. Park & Associates, PLC

(57) ABSTRACT

The invention provides a proton-conducting electrolyte that has excellent proton-conducting properties, heat resistance, and chemical stability without containing any fluorine. The proton-conducting electrolyte contains polyamide sulfamidic acid in which a polyamide backbone has side chains of sulfamidic acid groups. The polyamide sulfamidic acid may be represented by the formula:

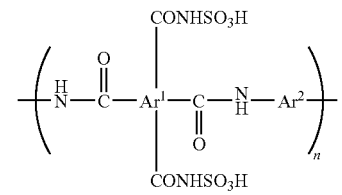

where $Ar^1$ and $Ar^2$ are each an aromatic ring or a group containing an aromatic ring and n is the average degree of polymerization and is an integer between 100-300,000.

4 Claims, No Drawings

PROTON-CONDUCTING ELECTROLYTE AND FUEL CELL USING THE SAME

BACKGROUND OF THE INVENTION

This application claims the priority to and benefit of Japanese Patent Application No. 2004-59139, filed on Mar. 3, 2004, in the Japanese Intellectual Property Office, and Korean Patent Application No. 10-2004-0074190, filed on Sep. 16, 2004, in the Korean Intellectual Property Office, the disclosures of which are incorporated herein in their entirety by reference.

1. Field of the Invention

The present invention relates to a proton-conducting electrolyte and a fuel cell using the same.

2. Description of the Related Art

A fluorinated polyethylene sulfonic acid group is widely used in an electrolyte membrane for a fuel cell. The fluorinated polyethylene sulfonic acid group has excellent proton-conducting properties and chemical stability, etc. and is used in various applications such as salt electrolysis, seawater desalination, and water treatment. Electrolyte membranes that contain the fluorinated polyethylene sulfonic acid group are commercially available under various trade names including, Nafion™ Membrane, Flemion™ Membrane, Aciplex™ Membrane, and Dow™ Membrane. However, since these membranes contain fluorine, they are both environmentally unfriendly and expensive.

Polystyrene sulfonic acid, which is used in an ion exchange resin or membrane for water treatment, and a sulfonated aromatic polymer, which is used in a fuel cell, are suggested as possible alternate electrolytes that do not contain fluorine (see, Japanese publication of PCT No. Hei 11-502245; T. Kobayashi, M. Rikukawa, K. Sanui, N. Ogata, Solid State Ionics, Vol. 106, 1998, p 219). However, these compounds may not have sufficient heat resistance and chemical stability to be suitable as an electrolyte in a fuel cell.

It was found that a sulfamidic acid group has the same acidity as a sulfonic acid group and is thermally and chemically stable. The present invention overcomes the previously mentioned problems by providing a specific polymer containing a sulfamidic acid group that may have excellent acidity, ion exchange capacity, proton-conducting properties, membrane-forming capability, heat resistance, and chemical stability. In addition, it may be synthesized at a lower cost in a reduced number of reaction steps and results in a high yield.

SUMMARY OF THE INVENTION

The present invention provides a proton-conducting electrolyte that may have excellent proton-conducting properties, heat resistance, and chemical stability without the presence of a fluorine-containing compound. The invention also provides a fuel cell using the proton-conducting electrolyte.

One aspect of the present invention provides a proton-conducting electrolyte that comprises polyamide sulfamidic acid in which a polyamide backbone has side chains of sulfamidic acid groups.

Another aspect of the present invention provides a fuel cell that comprises a pair of electrodes and an electrolyte membrane interposed between the electrodes. The proton-conducting electrolyte described above is used in the electrolyte membrane and/or at least one of the electrodes.

The above and other features and advantages of the present invention will become more apparent by describing its exemplary embodiments.

DETAILED DESCRIPTION OF THE INVENTION

A proton-conducting electrolyte according to an embodiment of the present invention contains at least one type of polyamide sulfamidic acid. The polyamide sulfamidic acid may be represented by Formula 1, which shows a polyamide backbone with side chains of sulfamidic acid groups.

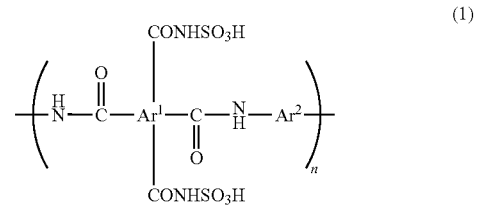

(1)

In Formula 1, $Ar^1$ and $Ar^2$ are each an aromatic ring or a group containing an aromatic ring and n is the average degree of polymerization and is an integer between 100-300,000. $Ar^1$ and $Ar^2$ are compounds including, but not limited to benzene, naphthalene, diphenyl ether, diphenyl sulfone, diphenyl sulfide, biphenyl, and benzophenone. Hereinafter, the polyamide sulfamidic acid represented by formula 1 may also be referred to as polyamide sulfamidic acid (6).

Polyamide sulfamidic acid is said to have a high proton conducting capacity because it can efficiently generate protons and simultaneously conduct the protons with its sulfamidic acid groups, which have high acidity and are attached as side chains thereto.

To demonstrate that the sulfamidic acids have high acidity, benzene sulfamidic acid ($C_6H_5CONHSO_3H$) was synthesized by first subjecting benzoic acid to an acid chlorination reaction. Next, the product was reacted with amidosulfuric acid triethylamine salt, and then that product was subjected to a cation exchange reaction. Acid dissolution constants were respectively measured using acid-base titration for various acids including benzene sulfamidic acid. Benzene sulfamidic acid had an acid dissolution constant value of 1.48, methyl sulfaminic acid was 1.64, p-toluene sulfonic acid was 1.50, and trifluoromethane sulfonic acid was 1.36. These values indicate that the sulfamidic acid group accelerates acid dissolution due to the electric adsorption of the carbonyl group. Thus, the sulfamidic acid group exhibits high acidity and high proton dissolution values that are comparable to those of a sulfonic acid group.

Polyamide sulfamidic acid represented by formula 1 may be synthesized by subjecting the carboxylic acid groups in side chains of polyamide acid to a sulfamidation reaction. This is advantageous because the reaction can be easily performed.

Polyamide sulfamidic acid (6) may also be obtained by subjecting the carboxylic acid groups from the side chains of the polyamide acid to an acid chlorination reaction, reacting the product with amidosulfuric acid triethylamine salt, and then, subjecting the product to an cation exchange reaction. The synthesis steps of the above polyamide sulfamidic acid (6) are shown below in Scheme 1.

Scheme 1

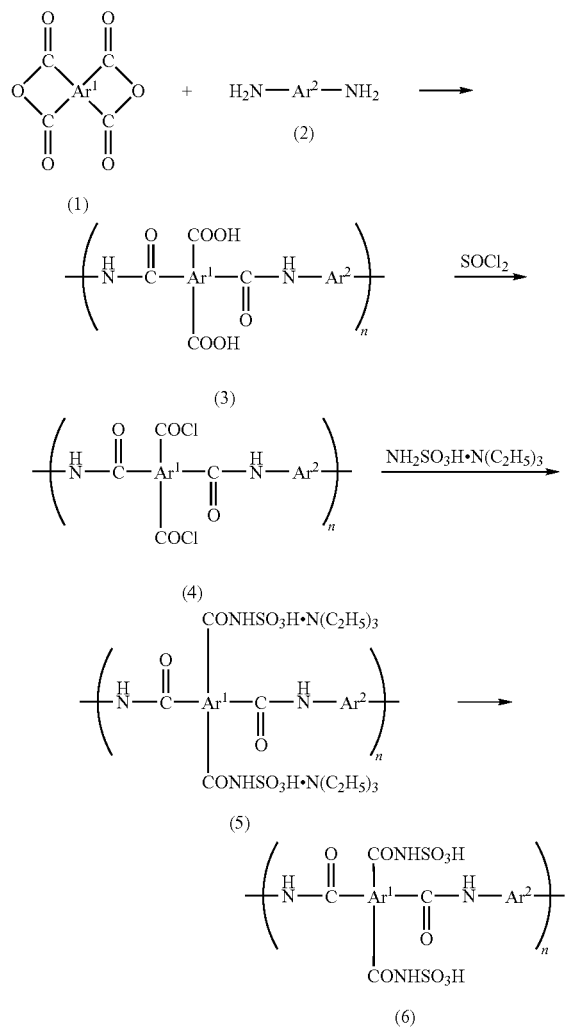

As shown in Scheme 1, the starting polymer, a polyamide acid (3) can be produced, for example, using polycondensation of an aromatic tetracetic acid dianhydride (1) with an aromatic diamine (2). In compounds (1)-(3), $Ar^1$, $Ar^2$, and n are the same as defined in formula 1 (target product).

The polyamide acid (3) is mixed with thionyl chloride ($SOCl_2$) in an amide-based solvent at room temperature or lower for at least several and up to 24 hours, while being stirred, so that the carboxylic acid groups in the side chains of the polyamide acid (3) are converted into acid chloride groups (acid chlorination, compound (4)). Examples of the amide-based solvent include, but are not limited to N,N'-dimethyl acetamide and N,N'-dimethyl formamide. After the reaction, the resulting solution is poured into an organic solvent such as methanol, for example, and the precipitates are filtered and washed to separate the resulting polymer (4).

The resulting polymer (4) is mixed with amidosulfuric acid triethylamine salt ($NH_2SO_3H \cdot N(C_2H_5)_3$) in an amide-based solvent at room temperature or lower for at least several and up to 24 hours, while being stirred, to synthesize polyamide sulfamidic acid triethylamine salt (5). Examples of the amide-based solvent are the same as those in the previous acid chlorination reaction. After the reaction, the resulting solution is poured into methanol, etc. and the precipitates are filtered and washed to separate the resulting polymer (5).

Finally, a cation exchange reaction where the sulfamidic acid salt is converted into sulfamidic acid is performed by passing a solution of polyamide sulfamidic acid triethylamine salt (5) in N,N'-dimethyl acetamide through a cation exchange resin. This reaction essentially protonates the reactant (5). The resulting solution is poured into methanol, dichloromethane, or chloroform, etc. and the precipitates are filtered and washed to obtain the target polyamide sulfamidic acid (6).

The resulting polyamide sulfamidic acid (6) is soluble in N,N'-dimethyl acetamide, N,N'-dimethyl formamide, N-methylpyrolidine, dimethyl sulfoxide, for example, but is insoluble in water, methanol, chloroform, hexane, benzene, toluene, for example. It also has a high heat resistance (see the results of thermogravimetric analysis below. In addition, a strong homogenous membrane can be obtained by forming a membrane using polyamide sulfamidic acid (6) in a casting method as described the following Examples.

The proton-conducting electrolyte according to an embodiment of the present invention can include other components in addition to the polyamide sulfamidic acid, if necessary, without departing from the concept of the present invention. For example, a fluorine-containing polymer, such as polytetrafluoroethylene can be used as a reinforcing agent in the proton-conducting electrolyte to increase the strength of the resultant membrane. Also, a basic nitrogen-containing polymer, an oxygen-containing polymer, or a sulfur-containing polymer, etc. can be mixed with the polyamide sulfamidic acid to form an ion-complex electrolyte. In addition, orthophosphoric acid, metaphosphoric acid, or polyphosphoric acid, etc. can be mixed with the polyamide sulfamidic acid to form a gel type electrolyte.

According to another aspect of the present invention, a fuel cell may be manufactured using the previous proton-conducting electrolyte. The fuel cell comprises a pair of electrodes and an electrolyte membrane interposed between the electrodes. The proton-conducting electrolyte may be used in the electrolyte membrane or at least one of the electrodes, or in both the electrolyte membrane and at least one of the electrodes.

The electrolyte membrane is formed by casting a proton-conducting electrolyte on a plate of polytetrafluoroethylene, etc. To obtain a gel membrane, the polyamide sulfamidic acid is mixed with orthophosphoric acid, metaphosphoric acid, or polyphosphoric acid, for example, and then, formed into a membrane. Alternatively, orthophosphoric acid, metaphosphoric acid, or polyphosphoric acid, etc., is impregnated into a membrane comprised of the polyamide sulfamidic acid to obtain a gel membrane.

Application of the proton-conducting electrolyte to electrodes will be described in the following Examples.

By using a proton-conducting electrolyte in an electrolyte membrane of a fuel cell, the fuel cell has reduced internal impedance, increased current density, higher output power, and longer lifespan. Especially, when the proton-conducting electrolyte is used in both the electrolyte membrane and the electrodes, the protons are easily conducted to the inside of the electrodes, and thus, internal resistance of the electrodes is reduced and reaction area is increased.

EXAMPLES

The present invention will be described in more detail by presenting the following examples. These examples are solely for illustrative purposes, and are not intended to limit the scope of the present invention.

Example 1

Synthesis of Polyamide Sulfamidic Acid

Polyamide sulfamidic acid was prepared according to scheme 1 using polyamide acid (3) where $Ar^1$ and $Ar^2$ are both benzene and the polyamide acid (3) had an average molecular weight of $4.1 \times 10^2$/gmol.

Next, 0.60 g (5 mmol) of thionyl chloride was slowly dripped into a solution of 0.21 g (0.5 mmol) of polyamide acid in 200 mL of N,N'-dimethyl acetamide under a nitrogen atmosphere and mixed for 3 hours with stirring. The resulting solution was concentrated to 20 mL and poured into 400 mL of dichloromethane. The formed precipitates were filtered and washed with dichloromethane, and then dissolved in 20 mL of N,N'-dimethyl acetamide.

Separately, 0.49 g (5 mmol) of amidosulfuric acid and 0.51 g (5 mmol) of triethylamine were added to 3 mL of dichloromethane to form amidosulfuric acid triethylamine salt. The formed salt was slowly dripped into the above polymer solution under a nitrogen atmosphere and mixed for 3 hours with stirring. The resulting solution was poured into 400 mL of dichloromethane. The formed precipitates were filtered and washed with dichloromethane, and then dried at 50° C. overnight under reduced pressure. As a result, 0.32 g of yellow powder was obtained for a yield of 81%.

The yellow powder was identified using $^1$H-NMR spectrum (DMSO-$d_6$, 500 MHz), which showed spectrums of 1.16 ppm (s, 18H), 3.08 ppm (s, 12H), 7.04 ppm (m, 4H), 7.71 ppm (m, 4H), 8.06 ppm (m, 1H), 8.86 ppm (s, 1H), 10.53 ppm(s, 2H). In addition, an absorption resulting from a carbonyl group of 1685, 1654 cm$^{-1}$ ($v_{C=O}$) and an absorption resulting from a sulfonic acid group of 1118, 1045 cm$^{-1}$ ($v_{S=O}$) were observed in IR spectrums of the yellow powder. Thus, it was confirmed that polyamide sulfamidic acid triethylamine salt was formed.

Next, a solution of N,N'-dimethyl acetamide containing 0.27 g (0.35 mmol) of the previously prepared polyamide sulfamidic acid triethylamine salt was passed through a cation exchange resin (AMBERLYST 15JWET, manufactured by Organo) to exchange protons. The obtained solution was concentrated to 20 mL and dripped into 400 mL of dichloromethane. The formed precipitates were filtered and washed with dichloromethane, and then dried at 50° C. overnight under reduced pressure. As a result, 0.19 g of light yellow powder was obtained for a yield of 95%.

This light yellow powder was identified using $^1$H-NMR spectrum (DMSO-$d_6$, 500 MHz), which showed spectrums of 7.02-7.15 (m, 4H), 7.50-7.70 (m, 4H), 7.71-7.78 (m, 1H), 7.95-8.23 (m, 1H), 10.43-10.65 (m, 2H). In addition, an absorption resulting from a carbonyl group (1685, 1656 cm$^{-1}$ ($v_{C=O}$)) and an absorption resulting from a sulfonic acid group (1116, 1051 cm$^{-1}$ ($v_{S=O}$)) were observed in the IR spectrums of the powders. Thus, it was confirmed that polyamide sulfamidic acid was formed. The average molecular weight of the polyamide sulfamidic acid was $5.7 \times 10^4$ g/mol as determined by GPC, calculated based on a polystyrene eluting solution of N,N'-dimethyl formamide.

The obtained polyamide sulfamidic acid was soluble in N,N'-dimethyl acetamide, N,N'-dimethyl formamide, N-methylpyrrolidine, dimethyl sulfoxide, for example, but it was insoluble in water, methanol, chloroform, hexane, benzene, toluene. In addition, as a result of thermogravimetric analysis for the polyamide sulfamidic acid, it was confirmed that the polyamide sulfamidic acid has a 10% thermal decomposition temperature ($T_{d10\%}$) of 232° C., which is 70° C. higher than that of polyamide acid. That result verifies that the polyamide sulfamidic acid has remarkably increased heat resistance due to the introduction of sulfamidic acid groups.

The polyamide sulfamidic acid had an ion exchange capacity of 3.2 meq/g (theoretical value is 3.5 meq/g) determined using acid-base titration, in which 25 mL of a 5 mM solution of the polyamide sulfamidic acid in dimethyl sulfoxide was titrated using a 0.01 M sodium hydroxide solution.

The polyamide sulfamidic acid was dissolved in N,N'-dimethyl acetamide and cast on a Teflon™ plate, and then dried at 50° C. for 16 hours under vacuum. The result was a strong homogeneous membrane of polyamide sulfamidic acid with a thickness of 20 μm that was light yellow. The membrane had a proton conductivity of $1.0 \times 10^{-3}$ Scm$^{-1}$ at 80° C. and 100% relative humidity. This value is $10^3$ times higher than that of a polyamide acid membrane. Thus, the membrane of polyamide sulfamidic acid had excellent proton conductivity.

Fabrication of Fuel Cell

Carbon powders supporting 50% by mass of platinum were added to a solution of the above polyamide sulfamidic acid in N,N'-dimethyl acetamide in a mass ratio of carbon powder supporting platinum to the polymer of 2:1. This mixture was then stirred to obtain a suspension.

The obtained suspension was applied to a porous carbon body with a porosity of 75% using a die coater. The porous carbon body had a porous carbon layer with surface micropore diameters in the range of 0.1-10 μm and a thickness of 40 μm. Then, the porous carbon body was dried to form a porous electrode useful for a fuel cell.

The polyamide sulfamidic acid membrane prepared previously was interposed between a pair of porous electrodes to form a single fuel cell. Wet hydrogen as a fuel and a wet air as an oxidant were supplied to the fuel cell and electricity generation was tested at 80° C. A voltage of 0.65 V was generated at an open circuit voltage of 0.95 V and a current density of 200 mA/cm$^2$ confirming that the fuel cell exhibited excellent operating capabilities.

Example 2

Polyamide sulfamidic acid was prepared in the same manner as in Example 1, except that the average molecular weight of the raw material polyamide acid was $1.1 \times 1.0^5$ g/mol. The obtained polyamide sulfamidic acid had a 76% yield.

The $^1$H-NMR spectrum of this polyamide sulfamidic acid (DMSO-$d_6$, 500 MHz) was 7.02-7.14 (m, 4H), 7.51-7.68 (m, 4H), 7.70-7.84 (m, 1H), 7.95-8.25 (m, 1H), 10.43-10.65 (m, 2H). The IR spectrum had an absorption resulting from a carbonyl group of 1685, 1655 cm$^{-1}$ ($v_{C=O}$) and an absorption resulting from a sulfonic acid group of 1116, 1051 cm$^{-1}$ ($v_{S=O}$). The average molecular weight of the polyamide sulfamidic acid was $1.5 \times 1$ g/mol determined by GPC, calculated based on polystyrene eluting solution of N,N'-dimethyl formamide. The 10% thermal decomposition temperature ($T_{d10\%}$) was 277° C. The ion exchange capacity was 2.9 meq/g (theoretical value is 3.5 meq/g). The proton conductivity was $9.1 \times 10^{-4}$ Scm$^{-1}$ at 80° C. with 100% relative humidity.

Example 3

Polyamide sulfamidic acid was prepared in the same manner as in Example 1, except that $Ar^1$ in polyamide acid (3) was naphthalene and the total yield was 76%.

The obtained polyamide sulfamidic acid's $^1$H-NMR spectrum (DMSO-$d_6$, 500 MHz) was 7.04-7.18 (m, 4H), 7.53-7.72 (m, 4H), 8.20-8.25 (m, 2H), 8.51-8.68 (m, 2H), 10.39-10.60 (m, 2H). The IR spectrum had an absorption resulting from a carbonyl group of 1684, 1655 cm$^{-1}$($v_{C=O}$) and an absorption resulting from a sulfonic acid group of 1116, 1051 cm$^{-1}$($v_{S=O}$). The average molecular weight of the polyamide sulfamidic acid was $6.6 \times 10^4$ g/mol determined by GPC, calculated based on polystyrene eluting solution of N,N'-dimethyl formamide. The 10% thermal decomposition temperature ($T_{d10\%}$) was 331° C. The ion exchange capacity was 2.6 meq/g (theoretical value: 3.0 meq/g). The proton conductivity was $6.7 \times 10^{-4}$ Scm$^{-1}$ at 80° C. with 100% relative humidity.

The polyamide sulfamidic acids obtained in Examples 2 and 3 both had excellent heat resistance and proton conductivity. In addition, the fuel cells using the acids exhibited excellent performance like the polyamide sulfamidic acid obtained in Example 1.

According to the present invention, a proton-conducting electrolyte that has a polymer containing a specific sulfamidic acid group has excellent proton-conducting properties, membrane forming capabilities, heat resistance, chemical stability, is environment-friendly and can be synthesized at low costs. In addition, by using the proton-conducting electrolyte according to the present invention, a fuel cell can have an increased current density, a higher output power, and longer lifespan.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A proton-conducting electrolyte, comprising:
   polyamide sulfamidic acid;
   wherein the polyamide sulfamidic acid comprises a polyamide backbone and side chains of sulfamidic acid groups.

2. The proton-conducting electrolyte of claim 1,
   wherein the polyamide sulfamidic acid is represented by the formula:

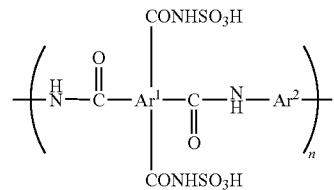

wherein Ar$^1$ and Ar$^2$ are each an aromatic ring or a group containing an aromatic ring, and
   wherein n is the average degree of polymerization and is an integer between 100-300,000.

3. The proton-conducting electrolyte of claim 2, wherein the polyamide sulfamidic acid is a sulfamidation product of carboxylic add groups in side chains of polyamide acid.

4. The proton-conducting electrolyte of claim 3, wherein the polyamide sulfamidic acid is obtained by subjecting the carboxylic add groups in side chains of the polyamide acid to an acid chlorination reaction, reacting the product with amidosulfuric acid triethylamine salt and then, subjecting that product to a cation exchange reaction.

* * * * *